United States Patent
Kobashi et al.

[15] 3,685,289
[45] Aug. 22, 1972

[54] METHOD FOR CONTROL OF A POWER BRAKE AND APPARATUS EMBODYING SAID METHOD

[72] Inventors: Uichiro Kobashi, 2-chome, Asahi-machi; Shigeo Aiki, 1,2-chome, Asahi-machi; Hirai Kariya, 1, Toyota-cho, all of Toyota, Japan

[22] Filed: Aug. 7, 1970

[21] Appl. No.: 61,931

[30] Foreign Application Priority Data

Aug. 10, 1969 Japan ..................... 44/63199

[52] U.S. Cl. .................. 60/54.5 P, 60/52 B, 91/434
[51] Int. Cl. ....... F15b 7/00, F15b 15/18, F15b 13/14
[58] Field of Search ................. 60/54, 54.6 P, 52 B

[56] References Cited

UNITED STATES PATENTS

| | | | |
|---|---|---|---|
| 3,478,519 | 11/1969 | Eggstein | 60/54.6 P |
| 3,526,089 | 9/1970 | Fulmer | 60/52 B |
| 3,188,796 | 6/1965 | French et al | 91/434 |
| 3,165,980 | 1/1965 | Péras | 60/52 B |

Primary Examiner—Martin P. Schwadron
Assistant Examiner—A. M. Zupcic
Attorney—Berman, Davidson & Berman

[57] ABSTRACT

Power brake control method and apparatus comprising a fluid pressure source, a fluid pressure accumulator, a pressure fluid braking circuit, wheel brake cylinders, a power brake control valve means interposed within the braking circuit to connect the pressure source to the wheel brake cylinders when operated by initial stepping force on the brake pedal, said control valve means normally preventing the connection between the pressure source and the wheel cylinders, and a brake booster connected to the control valve and operated by the counter force of fluid pressure within said control valve means reaching a predetermined value, whereby less stepping force on the brake pedal is required, quicker response in braking is obtainable, and sufficient braking force is exercised even though said accumulator fails to supply fluid at sufficient pressure.

12 Claims, 2 Drawing Figures

METHOD FOR CONTROL OF A POWER BRAKE AND APPARATUS EMBODYING SAID METHOD

The present invention relates to an hydraulic power brake control method and device embodying a pressure source, such as a fluid pressure pump driven by the prime motor of a vehicle, and more particularly to such a device in which an operative connection of a vacuum booster is made to a power brake control valve means functioning as a brake master cylinder, so that the braking pressure within the control valve means when operating as a master cylinder is increased by operation of the vacuum booster.

A known braking device is provided with a control valve means to lead pressure fluid from an accumulator to the operation chamber of a master cylinder, said master cylinder producing hydraulic braking pressure for wheel cylinders by stepping force on a brake pedal, thereby said hydraulic braking pressure being increased. In this known device, however, any failure of the accumulator in supplying pressure fluid to the control valve, because of drop of pressure in the accumulator could easily have disastrous consequences due to reduction or absence of hydraulic braking pressure at the wheel cylinders.

An important object of the present invention is, therefore, to provide a power brake control method and device having control valve means which in response to operation of a brake pedal supplies fluid pressure from an accumulator to braking circuits connected with wheel cylinders and functions as a brake master cylinder, said device including a brake booster operatively connected to said control valve means, said booster being inoperative when fluid pressure in said accumulator is adequate for braking, but which produces braking fluid pressure, as a result of stepping force on the brake pedal, when adequate fluid pressure is not obtainable from said accumulator, so that a vehicle is nevertheless provided with sufficient braking force.

A second important object of the present invention is to provide a method and device for control of hydraulic braking pressure, having the above described characteristics, wherein, accumulator pressure, vacuum booster pressure and master cylinder pressure produced by stepping force on a brake pedal are supplied in sequence to the braking circuits, so that the braking effect on a vehicle is increased as necessary, thus requiring less force application to the brake pedal and yielding quicker braking response.

A third important object of the present invention is to provide a device of the above mentioned type, wherein, in case said accumulator and said vacuum booster fail to supply braking fluid pressure, the stepping force applied to the brake pedal gives rise to sufficient braking fluid pressure within said brake control valve means to arrest the vehicle.

A fourth important object of the present invention is to provide a device of the above mentioned type, wherein, fluid pressure accumulated in said accumulator from an oil pump, for example, is also supplied to the power steering means of a vehicle.

The above and other objects, features and advantages of the present invention will become more readily apparent from the following description of the preferred embodiment with reference to the accompanying drawings forming a part of the specification.

IN THE DRAWINGS

Figure 1:
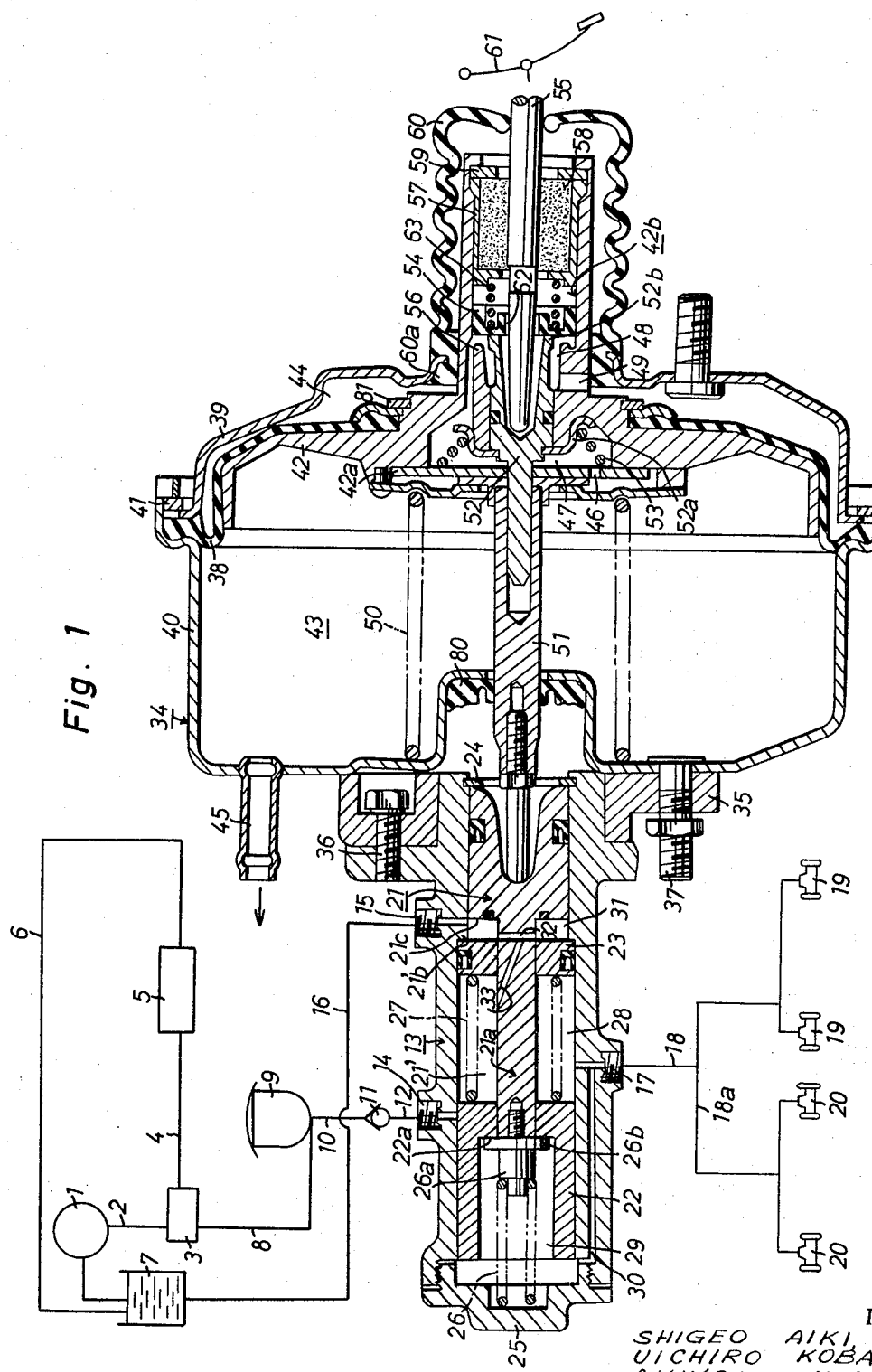
FIG. 1 is a longitudinal axial cross-sectional view of a power brake control valve and connected vacuum booster together with a pressure fluid circuit diagram embodying the control system of the present invention.

Referring now to FIG. 1, a preferred embodiment of the present invention is explained in the following description. An oil pump 1 is connected to a flow dividing valve 3 through a conduit 2, the oil pump 1 being driven by the prime motor of a vehicle. A general type of a power steering valve 5 communicates with the flow dividing valve 3 through a conduit 4 and with a fluid reservoir 7 through a conduit 6. The power steering valve 5 having no direct connection with the present invention, no explanation thereof is made herein. Accumulator 9 is connected to the flow dividing valve 3 through a conduit 8, and is connected with an input port 14 for pressurized fluid provided on a control valve means 13, to be described later in detail, by conduit 10 and conduit 12. Another port 15 of the control valve 13 is connected to the reservoir 7 through a conduit 16. Braking pressure fluid in the control valve means 13 is supplied from a port 17 to wheel cylinders 19,19 through a conduit 18 and wheel cylinders 20,20 through an extension conduit 18a.

The control valve means 13 has subenergizing means in the form of a vacuum booster 34. Control valve 13 has a first piston 21, a second piston 23 and a piston-valve 22 — all snugly and reciprocatively engaged within the bore 21' thereof. A small piston 21a integral with and projecting forwardly from the first piston 21 passes reciprocatively through openings in the central portions of the second piston 23 and the piston-valve 22. The right, or rear, end of the first piston 21 is arrested by a retainer 24 and a return spring 26 is provided between the left, or forward, end of the small piston 21a and a plug 25 threaded in the valve bore 21'. The second piston 23 is positioned in the rearward portion of the valve bore 21', being prevented from moving rearwardly by a shoulder portion 21'b of the bore 21'. The piston valve 22 has an approximately hollow cylindrical shape and is disposed in the forward portion of the valve bore 21'. The inside wall 22a of the valve is arrested by a shoulder portion 26b of a retainer plug 26a threaded in the small piston 21a of the first piston 21. A spring 27 is provided in a first operation chamber 28 formed between the piston valve 22 and the second piston 23. The chamber 28 constantly communicates through a passageway 30 in the control valve housing wall with a second operation chamber 29 formed at the left, or forward, end of the piston 22. The port 15 is connected with another chamber 31 between the first and second pistons. Chamber 31 is connected to the first operation chamber 28 by a vertical passage 32 and angled duct 33 passing through small piston 21a.

The vacuum booster 34 is threaded on the rear end of the control valve 13 through a connecting member 35 with a plural number of bolts 36 and 37. The structure of the booster 34 is such that the outer edge of a diaphragm 38 is sandwiched airtightly with an inner housing 39 and an outer housing 40 through a snap ring 41. The inside surface of the diaphragm 38 is airtightly adhered on a power piston 42, dividing the inside space of the booster 34 into two chambers 43 and 44. The chamber 43 is connected to an engine manifold not shown in the drawing by a duct connected to nipple 45, and under ordinary conditions the chamber 43 communicates with the chamber 44 through a port 46, a chamber 47 and passageways 48 and 49, thus both chambers 43 and 44 being kept evacuated. The power piston 42 is ordinarily urged rearwardly by a return spring 50 provided in the chamber 43 and connected operatively with a rod 51. The left end, of the rod 51 maintains contact with the right end of the piston 21 of the control valve 13. A transmission member 52 is reciprocatively engaged in a bore in the rear portion of the rod 51. Interposed between a shoulder 52a of the transmission member 52 and a member 42a which is a portion of the power piston 42, is a spiral spring 53 to regulate the opening operation of a booster control valve 54. The urging load of the spiral spring 53 is predetermined to start the spring 53 flexing under such compressive force as exceeds the pressure acting in the second chamber 29 of the control valve and less than the total pressure acting in the first and second chambers 28 and 29. A valve seat 52b at the rear end of the transmission member 52 ordinarily seats on the booster control valve 54, and a push-rod 55 is in contact with the transmission member 52, the push-rod 55 being to be operated by stepping force on the brake pedal 61. A valve seat 56 is provided on the rear of the power piston 42 and seats on the valve 54 to keep the chamber 43 airtight in response to the movement of the transmission member 52 leftward within the power piston 42. The valve 54 is snugly, slidably, and airtightly engaged in a cylinder 42b of the power piston 42. A cylinder shaped spring receiver 57, enclosing asbestos air-cleaner 58, is pressed into the cylinder 42b of the power piston 42 and held tightly in place by a snap ring 59. A spring 63 is interposed between the valve 54 and the spring receiver 57.

A dustcover 60 made of rubber is formed in a bellows style to cover the outer wall of the cylinder 42b. The end 60a of the dustcover is airtightly movable against the outer surface of the cylinder 42b. Further in FIG. 1, reference numeral 80 indicates a sealing member through which the rod 51 movably passes out of the booster 34, and reference numeral 81 indicates a retainer to keep the inner surface of the diaphragm 38 airtightly adhered onto the power piston 42.

The device constructed as described above in accordance with the present invention operates as follows:

The prime motor of a vehicle drives the oil pump 1, which, in turn, pressurizes and delivers fluid to the accumulator 9 through the conduit 2, the flow dividing valve 3 and the conduit 8. The pressure fluid is accumulated in the accumulator 9 until the pressure in the accumulator comes up generally to 60–70 kilograms per square centimeter. Then, the fluid returns to the reservoir 7 through the flow dividing valve 3, the conduit 4, the power steering valve 5 and the conduit 6, the pressure in the accumulator being kept always at 60–70 kilograms per square centimeter. When the driver presses the brake pedal 61 down as necessary for braking the vehicle under the above mentioned conditions, the push-rod 55 connected to the pedal 61 urges the transmission member 52 is the left as viewed in the drawing. This thrust force is not yet sufficient to cause deflection (compression) of the spiral spring 53, the predetermined repulsive force of which overcomes the spring 50. In turn, the rod 51 is urged to the left in the drawing through the member 42a. The booster 34 still remains in its normal status, that is to say, the rod 51, the power piston 42 and the transmission member 52 make no relative displacement but move as a unit slightly to the left as viewed in the drawing. During this movement, the valve seat 52b, remains seated against the valve 54, the valve 56 remains open moving slightly with parts 42 and 52. The slight movement leftward of rod 51 causes the first piston 21 of the control valve means 13 to move against the force of spring 26. This causes the vertical passage 32 in the small piston 21a to close by sliding into the second piston 23 and prevents communication of the chambers 28 and 29 with the reservoir 7. At the same time, the shoulder portion 26b of the plug 26a moves to the left and the piston valve 22 follows by urging force of the spring 27. This removes the outer sliding wall of the piston valve 22 from the input port 14 which now opens to flow of fluid from the accumulator 9 into the chamber 28 through the conduit 10, the check valve 11 and the conduit 12, the pressure fluid being further led into the chamber 29 through the passageway 30. The increased fluid pressure in the two chambers 28 and 29 is then delivered to the wheel cylinders 19,19 and 20,20 through the port 17, the conduit 18 and the extension conduit 18a to produce the initial braking effect as specified by the characteristic line 1 in FIG. 2.

As the pressure in the chamber 29 is being increased by leftward initial movement of the parts as described above, the fluid pressure affecting the small piston 21a of the first piston 21 exercises a counter force toward the right onto the first piston 21, the counter force being transmitted to the power piston 42 of the booster 34 through the rod 51. This creates thrusting moment to move the power piston 42 to the right as viewed in the drawing. When an additional stepping force is exercised on the brake pedal 61 to raise the push-rod load or force up to the point A FIG. 2, the spiral spring 53 of the booster 34 is flexed (compressed) in response to the counter force of the power piston 42. At this moment, shoulder portion 21c of the first piston 21 moves leftward and is pressed onto the second piston 23 which remains relatively stationary so that continued leftward movement of rod 55 causes the transmission member 52 and its shoulder portion 52a to contact the member 42a to separate the valve seat 52b from the valve 54 and at the same time to seat the valve seat 56 of the power piston 42 against the valve 54. This condition of the parts allows air to rush into the chamber 44 of the booster 34 through the air cleaner 58, the passageway 62, the chamber 48 and the passageway 49. At the same time, the valve 54 has servo-operation and the pressure difference between the chambers 43 and 44 pushes the power piston 42 to the left overcoming the force of the spring 50 and, in turn, the rod 51 urges the first piston 21 further to the left. Accordingly, the first piston 21 and the second piston 23 are now urged to the left as a unit against the springs 27 and 26 to increase the fluid pressure in the chambers 28 and 29. Consequently, braking fluid pressure delivered to the wheel cylinders 19,19 and 20,20 is increased as shown by the characteristic line 2 in FIG. 2. At this moment, the piston valve 22 is in touch with the shoulder portion of the plug 25 and the fluid in the chamber 28 is prevented from returning to the accumulator 9 by the effect of the check valve 11.

The braking fluid pressure to be supplied into the wheel cylinders 19,19 and 20,20 can further be increased by exercising additional stepping force on the brake pedal 61 which urges the rods 55 and 51 and the piston 21 further to the left to increases the fluid pressure in the chambers 28 and 29 of the control valve means 13.

As described in detail, with the device in accordance with the present invention, the braking fluid pressure can be increased in three steps, and particularly, the fact may be considered to be a great advantage that a desirable braking effect can be obtained in proportion to the stepping force on the brake pedal 61 because of the initial braking counter force or moment.

Additional features and advantages of the present invention will become apparent from the following description. In case that the fluid pressure ratio in the accumulator 9 is lowered down to the point B, FIG. 2, due to trouble in the fluid pump 1 and so forth, the pressure in the chambers 28 and 29 is still increased as shown by the characteristic line 1, FIG. 2, by the stepping force on the brake pedal 61. The stepping force urges the first piston 21 of the control valve means 13 to the left in the drawing against the spring 26 to close the passages 32 and 33 and port 15 which communicate with the reservoir 7 and at the same time to open the port 14 which communicates with the accumulator 9. And an additional stepping force on the brake pedal 61 makes the shoulder portion 21c of the first piston 21 touch the piston 23. The large pressure-receiving area of the second piston 23 prevents the second piston 23 from moving to the left, the pressure ratio remaining unchanged as shown by the characteristic line 3 in FIG. 2. Then additional stepping force on the brake pedal 61 produces leftward movement of the first piston 21 and the second piston 23 as a unit against the springs 26 and 27 to increase the fluid pressure in the chambers 28 and 29, until the left end of the piston valve 22 touches the plug 25.

The fluid pressure on the pressure receiving areas of both the second piston 23 and the small piston 21a of the first piston 21 acts on the brake pedal 61 as counter moment or force. And, when said counter moment becomes equal to the counter moment on the first piston 21 in the normal operation as previously described, the spiral spring 53 is flexed (compressed) in response to the thrust force of the counter moment to urge the power piston 42 of the booster 34, or in other words, in response to the stepping force of the brake pedal 61. This makes the valve seat 56 of the power piston 42 seat against the valve 54 and the valve seat 52b separate from the valve 54. Accordingly as in the case of the normal operation already into described, air rushes into chamber 44 to produce pressure differences between the chambers 43 and 44 of the booster 34. Consequently, the power piston 42 moves to the left against the return spring 50 and the rod 51 urges the pistons 21 and 23 further to the left to increase the pressure in the chambers 28 and 29 as shown by the characteristic line 4 in FIG. 2. As in the case of the normal operation, the pressure in the chambers 28 and 29 can be increased in accordance with the increases of the stepping force on the brake pedal 61, which in turn, affects the wheel cylinders 19,19 and 20,20 to produce increased braking of the vehicle.

Now in the case that the accumulator 9 fails entirely in supplying pressure fluid due to the trouble in the oil pump 1 and so forth, the initial stepping force on the brake pedal 61 still urges the first piston 21 of the control valve means 13 to the left against the spring 26 to close the passages 32 and 33 and port 15 which communicate with the reservoir 7 and at the same time to open the port 14 which communicates with the accumulator 9. The fluid pressure is, however, not increased in the chambers 28 and 29. And an additional stepping force on the brake pedal 61 makes the shoulder portion 21c of the first piston 21 touch the piston 23 and produces leftward movement of the first piston 21 and the second piston 23 as a unit against the springs 26 and 27 to increase the fluid pressure in the chambers 28 and 29 as shown by the characteristic line 5 in FIG. 2. When the fluid pressure is raised up to the point D in FIG. 2, the fluid pressure on the pressure receiving areas of the second piston 23 and the small piston 21a of the first piston 21 acts on the brake pedal 61 as counter moment. And, when said counter moment becomes equal to the counter moment on the first piston 21, as in the normal operation previously described, the piston 42 of the booster 34 is urged to the right in response to said counter moment. Consequently, the booster 34 is operated and the braking fluid pressure is obtained, the pressure being as shown by the characteristic line 6 in FIG. 2.

Further in the case that the booster 34 becomes inoperative, for example, in the case no vacuum status is maintained in the chambers 43 and/or 44, even so normal fluid pressure is obtainable from the accumulator 9, and the brake pedal 61 is normally operated, which gives sufficient braking effect to the vehicle.

Figure 2:
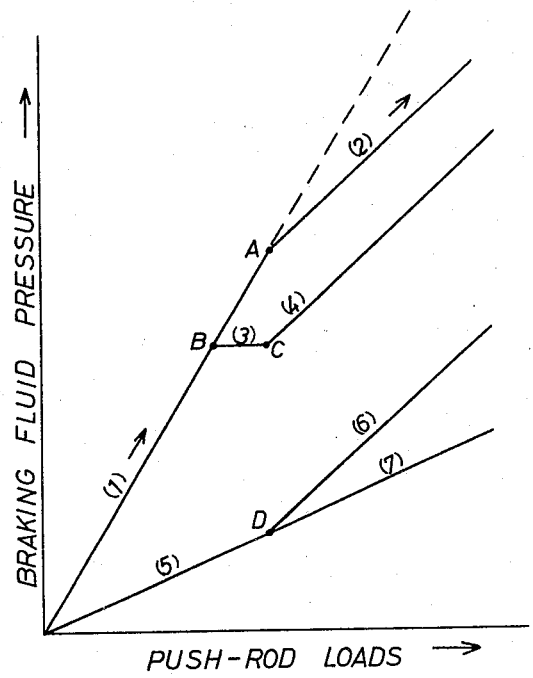
FIG. 2 is a graph showing characteristic curves of "push-rod loads versus braking fluid pressure" obtained in use of the control system method and apparatus of the present invention.

Finally in the case that both of the accumulator 9 and the booster 34 become inoperative, the stepping force on the brake pedal 61 still produces braking pressure on the fluid in valve 13 as shown by the characteristic line 7 in FIG. 2.

As should be very apparent and clear from the above descriptions, with a device according to the invention, normally, braking fluid pressure of three steps can be obtained continuously and in sequence from the accumulator 9, the booster 34 and the valve 13 acting as a master cylinder. This yields the advantages such as the capability to increase the pressure as necessary, the need for lower stepping force on the brake pedal, quick responses of braking and particularly, the capability to absorb properly the counter moment acting on the brake pedal 61 in normal operation. Furthermore, even in case of insufficient supply of pressure from the accumulator 9, very quick operation of the vacuum pressure assures safe braking operation.

Although a certain specific embodiment of the present invention has been shown and described, it is obvious that many modifications thereof are possible. The invention, therefore is not intended to be restricted to the exact showing of the drawings and descriptions thereof, but is considered to include reasonable and obvious equivalents.

What is claimed is:

1. The combination of a control valve for a power brake with a booster, wherein said control valve includes a housing having a cylindrical bore extending forwardly and rearwardly, a first port in said housing for communicating with a fluid pressure source, a second port in said housing for connection to wheel cylinders, and an exhaust port in said housing, a first piston reciprocatively engaged in the rear portion of said bore and provided with a small piston jutting forwardly from the front portion thereof, the forward end of the small piston being biased rearwardly by a first spring engaged therebetween and the inner surface of the forward wall of said housing, the rear end of the small piston being operatively connected with a push-rod to be urged forwardly by a brake pedal, a second piston snugly and reciprocatively engaged in said bore and having the small piston of said first piston pass through an opening in the central portion thereof, a piston valve reciprocatively engaged in said cylinder and having the forward portion of the small piston of said first piston pass reciprocatively through an opening in the central portion thereof, a second spring interposed between said second piston and said piston valve so as to bias said second piston normally toward the rear portion of said bore and said piston valve normally toward the front portion of said bore, and a passageway in said housing providing constant communication between a first chamber formed in the bore between said second piston and said piston valve and a second chamber formed in the fore in front of said piston valve, said first chamber being connected with said exhaust port, said booster including actuating means operatively connected to said first piston and for engagement by a brake rod whereby said piston valve, when the first piston is urged forwardly, opens said first port, and when said first piston is in its normal position said piston valve closes said first port, and said booster being operative to urge said first piston further forwardly only when a counter force of predetermined value is generated by fluid pressure in one of said chambers acting rearwardly against said first piston and said booster actuating means.

2. The combination as set forth in claim 1, wherein said booster comprises a housing attached to the rear end of said control valve housing, said booster housing being divided into two evacuated chambers by a diaphragm, said diaphragm having a rod forming part of said booster actuator means and extending axially of the cylindrical bore of the control valve housing and projecting from the booster housing into contact with said first piston of the valve, the rear end of said booster housing having an air inlet controlled by a valve member, and a spring forming part of said booster actuator means normally urging said valve member to closed position, said spring being overcome by said counter force of predetermined value acting rearwardly against said first piston to open said valve member and permit entry of air into one of said booster chambers, whereby to move said diaphragm and connected rod forwardly to increase the pressure of fluid in said control valve.

3. The combination set forth in claim 2 wherein said diaphragm is supported by a drive piston connected to said rod, a transmission member slidably engaging said rod at one end and coupling with said brake pedal rod at the other end, said booster actuator spring being disposed to urge the transmission member rearwardly with respect to said drive piston so as to engage said valve member and hold it closed until receipt of said counter force of predetermined value.

4. The combination set forth in claim 3 wherein said booster actuator spring is preset to greater tension than said first spring of the control valve and less tension than the combined tension of the first and second springs of the control valve.

5. In a vehicle having a braking fluid pressure source, a pressure fluid reservoir, wheel brake cylinders, a brake pedal and a pressure fluid braking circuit to supply pressure fluid to said wheel cylinders from said source under control of the brake pedal, the combination comprising a power brake control valve means interposed within said pressure fluid braking circuit, said control valve means being operative to initially connect said braking fluid pressure source to said wheel cylinders in response to stepping force applied to the brake pedal, and then to increase the braking fluid pressure supplied to said wheel cylinders with continuing application of force to the brake pedal, said valve means being further operative to shut off communication between said pressure source and said wheel cylinders and to return pressure fluid to the reservoir from said wheel cylinders in response to release of the stepping force on the brake pedal, and a brake booster operatively connected with said control valve means to cause said control valve means to further increase the braking fluid pressure acting on said wheel cylinders in response to increase of force applied to the brake pedal, said booster including actuating means for initiating its pressure boosting operation only upon receipt of a counter force of predetermined amount acting on the brake pedal from said control valve means, said control valve means including a housing having a cylindrical bore extending forwardly and rearwardly, a first port in said housing communicating with said fluid pressure source, a second port in said housing connected with said wheel cylinders, and an exhaust port in said housing, a first piston snugly and reciprocatively engaged in said bore so as to be positioned in the rear portion thereof and provided with a small piston jutting forwardly from the front portion thereof, the forward end of the small piston being biased rearwardly by a first spring engaged therebetween and the inner surface of the forward wall of said housing, the rear end of the small piston being operatively connected with a push-rod urged forwardly by the brake pedal, a second piston snugly and reciprocatively engaged in said bore and having the small piston of said first piston pass through an opening in the central portion thereof, a piston valve snugly and reciprocatively engaged in said cylinder and having the forward portion of the small piston of said first piston pass reciprocatively through an opening in the central portion thereof, a second spring interposed between said second piston and said piston valve so as to bias said second piston normally toward the rear portion of said bore and said piston valve normally toward the front portion of said bore, a passageway in said housing providing constant communication between a first chamber formed in the bore between said second piston and said piston valve and a second chamber formed in the bore in front of said piston valve, and said first chamber being connected with said exhaust port, said actuating means in said booster being so connected to said first piston and said brake rod that when the first piston is urged forwardly said piston valve opens said first port to connect said fluid pressure source to the wheel cylinders through said first chamber and said second port, and when said first piston is in its normal position said piston valve closes said first port, and said booster being operative to urge said first piston further forwardly only when a counterforce of predetermined value is generated by fluid pressure in one of said chambers acting rearwardly against said first piston and said booster actuating means.

6. The combination as set forth in claim 5, wherein said brake booster is preset to initiate its operating to urge said first piston further forwardly when a counter force of predetermined value produced by fluid pressure acting in said first and second chambers acts on said first piston and booster actuating means.

7. The combination as set forth in claim 5, wherein said brake booster is preset to initiate its operation to urge said first piston further forwardly when a counter force of predetermined value produced by fluid pressure acting in said second chamber acts on said first piston and booster actuating means.

8. The combination as set forth in claim 5, wherein an accumulator is interposed in said pressure fluid braking circuit between said pressure fluid source and said control valve means.

9. The combination as set forth in claim 5, wherein said brake booster is a vacuum booster connected to the suction manifold of a combustion engine of the vehicle.

10. The combination as set forth in claim 9 wherein said brake booster comprises a housing attached to the rear end of said valve control means housing, said booster housing being divided into two evacuated chambers by a diaphragm, said diaphragm having a rod forming part of said booster actuator means and extending axially of the cylindrical bore of the valve control means housing and projecting from the booster housing into contact with said first piston of the valve control means, the rear end of said booster housing having an air inlet controlled by a valve member, and a spring forming part of said booster actuator means normally urging said valve member to closed position, said spring being overcome by said counter force of predetermined value acting rearwardly against said first piston to open said valve member and permit entry of air into one of said booster chambers, whereby to move said diaphragm and connected rod valve to increase the pressure of fluid in said control vale means.

11. The combination set forth in claim 10 wherein said diaphragm is supported by a drive piston connected to said rod, a transmission member slidably engaging said rod at one end and coupling with said brake pedal rod at the other end, said booster actuator spring being disposed to urge the transmission member rearwardly with respect to said drive piston so as to engage said valve member and hold it closed until receipt of said counter force of predetermined value.

12. The combination set forth in claim 11 wherein said booster actuator spring is preset to greater tension than said first spring of the control valve means and less tension than the combined tension of the first and second springs of the valve means.

* * * * *

UNITED STATES PATENT OFFICE
CERTIFICATE OF CORRECTION

Patent No. 3,685,289       Dated August 22, 1972

Inventor(s) UICHIRO KOBASHI, SHIGEO AIKI and AKIYOSHI HIRAI

It is certified that error appears in the above-identified patent and that said Letters Patent are hereby corrected as shown below:

In the heading, Column 1, change the names and addresses of the inventors, and add the assignees as shown below:

UICHIRO KOBASHI, 1,2-chome, Asahi-machi, Kariya-Shi;
SHIGEO AIKI,     1,2-chome, Asahi-machi, Kariya-Shi;
AKIYOSHI HIRAI,  1, Toyota-cho, Toyota-Shi, all of
Aichi-ken, Japan.

ASSIGNEES: AISIN SEIKI KABUSHIKI KAISHA, Aichi-ken, Japan,
           TOYOTA JIDOSHA KOGYO KABUSHIKI KAISHA, Aichi-ken, Japan.

Signed and sealed this 17th day of April 1973.

(SEAL)
Attest:

EDWARD M. FLETCHER, JR.                ROBERT GOTTSCHALK
Attesting Officer                      Commissioner of Patents